Aug. 16, 1932.  M. LICHT  1,872,639

POTATO HARVESTING MACHINE

Filed Sept. 20, 1930

Patented Aug. 16, 1932

1,872,639

UNITED STATES PATENT OFFICE

MARTIN LICHT, OF CASSEL, GERMANY

POTATO HARVESTING MACHINE

Application filed September 20, 1930, Serial No. 483,300, and in Germany October 14, 1929.

The known potato harvesting machines, in which the potato ridge dug by the share must be fed to a sifting device, such as for example horizontal rotating sifting wheels, are open to the objection, that the lower roll of the elevator necessary for raising the mass from the share and which was used in the shape of a circulating endless bar grate, was of such diameter in view of the easy running and manner of operation of the elevator, that the operation of the machine was greatly impaired by the friction of the elevators. In view of the manner of working of the share and its practical position however the diameter must be kept smaller than the above conditions would allow. It has been found, that elevators for raising the earth loosened by the share are not suitable and that they are unsatisfactory in practice because the space behind the share is much too limited for the proper size of elevator roll and its bearing.

Contrary thereto the most important feature of the invention is a conveying device, which is intended to take the place of the elevator and which presents the advantage that it engages directly under the share, can be easily driven, does not disadvantageously affect the operation of the machine, and further is particularly well suited for dealing with large masses. This conveying device may be so constructed, that it partially sifts the dug ridge during conveying and separates a portion of the earth by centrifugal force, so that the sifting device is relieved. If the conveying device, owing to its special construction, does not possess all these properties, an elevator may, if necessary, be provided behind same. As the conveying device is made as an inclined centrifugal or sifting wheel, the lifted potato ridge is quickly distributed and shaken apart, so that the throwing off of the earth is facilitated. Owing to the fact that during the passage of the earth mass from the conveying to the sifting wheel the mass moves from one side of the machine to the other, a repeated distribution of the earth mass will occur.

Several embodiments of the invention are illustrated by way of example in the accompanying drawing in which:—

Figure 1:
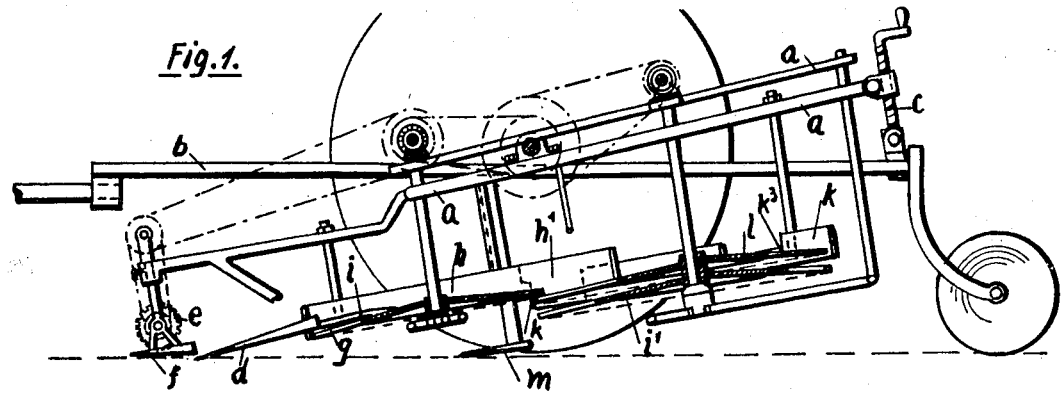
Figure 2:
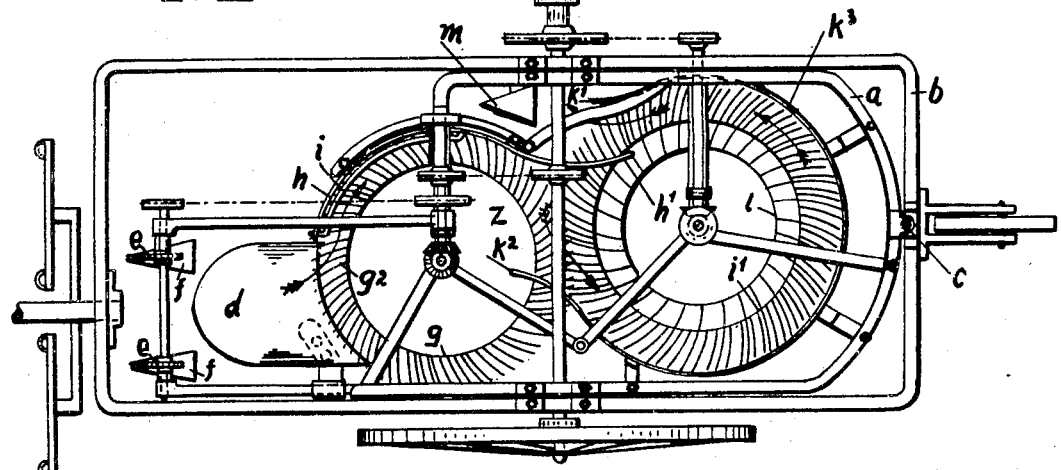
Figure 3:
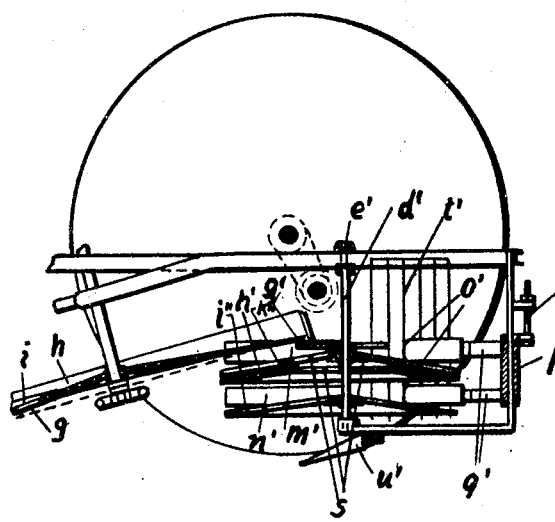
Figure 4:
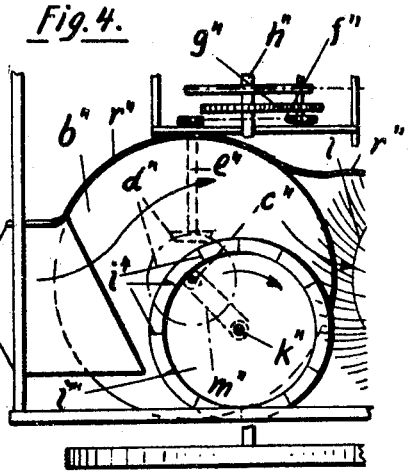

Fig. 1 is a part vertical longitudinal section.
Fig. 2 is a top plan view of Fig. 1.
Fig. 3 shows in section a modified form of construction of the sifting device.
Fig. 4 is a modified form of construction of the conveying device.

The inclination of the frame $a$ is adjustable in relation to the machine frame $b$ by means of a hand adjusting device $c$, so that a depth adjustment at the same time for the conveying share $d$ and for the travelling of the machine on the highway is rendered possible. Both frames $a$, $b$ are suspended on the wheel axle. The frame $a$ carries the entire arrangement for digging, separating the tops, the conveying and sifting of the potato ridge. This arrangement consists of the two toothed coulter discs $e$ driven for example by a sprocket wheel, which discs revolve in top catchers bent from thick sheet steel and extending like fingers at the front. These fingers serve for separating the tops on the right as also on the left from the conveying share $d$. The top catchers $f$ are formed like sledge runners and pick up the laid over tops. The cutting surfaces of the coulters cannot touch the ground. The shifting wheel adapted to serve as conveyor wheel $g$ is mounted upwardly inclined and rotatable behind the share $d$ extending slightly below same. It is composed of a disc $z$, slightly domed towards the middle and of a tine rim $q^2$ mounted thereon. The direction of rotation is indicated by an arrow, the sifting wheel $g$ being bordered on the one side by a catching ring $h$ with catching rod or bar $i$ mounted inwardly thereof and which exposes a gap opposite the tine rim of the wheel. This gap is adjustable in width by displacing the elements $i$ and $h$. Two superposed sifting wheels $l$ and $i^1$, driven by a common shaft, engage partly under the sifting wheel $g$, and are surrounded on the centrifugal force side by a common adjustable half ring $k$, which however has a turn-out $k^1$ and a cavity $k^3$ on one side. These sifting wheels $l$, $i^1$ rotate in the opposite direction to that of the sifting wheel $g$ indicated by arrows. The half ring $k$, is set off in upward direction on the other side and this set off portion $k^2$ grips over the sifting wheel $g$. The two sifting wheels $l$ and $i^1$ are, similarly to the conveyor wheel, each fitted with an inner disc domed upwardly in the middle and steel tine rim mounted thereon, however the upper sifting wheel $l$ has a smaller disc and tines at a wide distance apart. It is intended, to preliminarily sift the mass and to feed potatoes and earth through its tines onto the lower sifting wheel $i^1$. The catching ring $h$ of the sifting wheel $g$ is bent outwardly at $h^1$ in such a manner that it forms a guide surface for guiding the mass to the upper sifting wheel $l$, whereas the opposite guiding surface is formed by the set off part $k^2$ of the half ring $k$. In front of the turn-out $k^1$ a ridging share $m$ is arranged, which again opens up the already dug furrow. The drive of the wheels is effected by any suitable gearing shown diagrammatically in the drawing from the wheel axle of the machine.

The operation is as follows:—

The potato ridge, which is dug by the conveying share $d$ and which is freed from the top parts on both sides by the revolving coulters $e$, is caught by the sifting wheel $g$ brushing past below the share, and lifted to the sifting wheels $l$ and $i^1$ in the direction of the arrow. Owing to the centrifugal force of the quickly rotated sifting wheel $g$ the mixture of earth, tops, root fibres and potatoes is thrown outwards against the catching ring $h$ and bar $i$. The tines of the wheel $g$ thereby exert a sifting effect on the earth. The mass is consequently not only lifted but preliminarily sifted, a lateral ejection of the earth and admixture occurring through the gap between the ring $h$ or bar $i$ and the tine rim $g^2$. Consequently, an intensive sifting already commences directly at the side of the share. This circumstance alone enables a large mass to be conveyed. The bar $i$ is intended to hold back the tops, so that they are quickly conveyed upwards. The bar prevents at the same time the tops being caught in the gap between the ring $h$ and the tine rim $g^2$ and choking of the gap.

The remaining portion of the mass of earth, tops and potatoes is quickly conveyed upwards by the sifting wheel $g$ in the direction of the arrow along the guide surfaces $h^1$ and $k^2$ onto the upper sifting wheel $l$. Owing to the fact, that the sifting wheel $l$ rotates in the opposite direction to the sifting wheel $g$ and its tines are wider apart, the special effect is obtained, that the mass, as soon as it arrives on the sifting wheel $l$, is roughly torn asunder and spread out, as both sifting wheels $l$ and $i^1$ are of larger diameter than the sifting wheel $g$. The mass, owing to the arrangement of the half ring $k$, is compelled to participate almost in the entire rotation of the sifting wheels, so that not only a perfect sifting of the earth masses but also a complete separation of the tops and root fibres from the potatoes occurs. The tops, owing to the centrifugal force, pass outwards, are guided along the ring $k$ and flung out at the point where the ring is cut out at $k^3$. Potatoes, earth and short pieces of stalks drop onto the lower wheel $i^1$, the latter are here flung outwards through the gap between the ring $k$ and the wheel rim, whereas the potatoes arrive at the outlet of the ring $k$ on the right side of the machine in the furrow previously dug by the share $m$, whence the potatoes, being exposed, can be taken out by hand or with a fork, filled into sacks, or into boxes or the like by known conveying devices.

The sifting device may however be replaced by differently arranged sifting wheels. The sifting device in this instance (see Fig. 3) consists of a plurality of superposed sifting wheels $g'$, $h'$, $i''$ preferably arranged in slightly tapered shape on a common vertical shaft $d'$, and a guide disc $k'$ arranged between them. On the periphery of each of the sifting wheels $h'$ and $i''$ a guiding or catching and sifting ring $m'$ and $n'$ respectively is arranged at such a distance therefrom that small potatoes cannot fall through, said rings having a lateral aperture or turn-out $o'$. These rings are held on the frame adjustable for example by a carriage $p'$, holder $q'$ and set screw $r'$. The parts $h'$, $k'$ have central apertures $s$ covered by the sifting wheel $g'$. At the side of the turn-out $o'$ a catching grid $t'$ is mounted on the machine frame, and in front of this grid a share $u'$ for redigging the furrow of the already dug potato ridge.

The upper smaller sifting wheel $g'$ catches the ridge delivered by the sifting wheel $g$, allows the greater portion of the earth and potatoes to drop through and delivers by centrifugal force the remaining mixture of earth, potatoes and tops onto the larger sifting wheel $h'$ situated thereunder. The mixture is here subjected to a greater centrifugal force, so that the potatoes are held back by the ring $m'$, whereas the tops and earth are flung off through the gap between the ring $m'$ and the sifting wheel $h'$, the earth being further sifted through the wheel where it is caught by the disc $k'$ and thrown out also by the rotation thereof. The potatoes flung by the wheel $h'$ along the ring $m$ arrive through the turn-out $o'$ with the aid af the centrifugal force into the furrow dug by the auxiliary share $w'$. For the sifting wheel of the conveying device a sifting wheel of different construction or another conveying device may be substituted.

In the construction ilustrated in Fig. 4 the share $d$ engages over the disc $b''$ within the range of a lateral guide surface $r''$, which is rotatably mounted on the bearing $c''$ for the material to be conveyed. Its drive is effected from below through toothed wheels $d''$, shaft $e''$, chain gearing $f''$, toothed gearing g'' from the running wheel shaft h''. Above this disc b'' set at an angle at the same angle of inclination to the share, a bell-shaped disc wheel i''' is keyed on the axle k'' eccentrically to the disc b'' in the disc radius, said axle being mounted above this wheel, if necessary, variable in distance to the disc with adjusting device. It is driven in the same direction of rotation as the disc b'' through a chain gearing m'' from the axle of the disc b''. This bell-shaped wheel has ribs or bars $i^4$ on its periphery. An elevator may, if necessary, further be added to the conveyor wheel constructed in this manner.

The connection of the disc b'' to the bell-shaped wheel i''' arranged above same is the determining factor for the manner of operation of the conveying device for the ridge masses, because the share cut off at an angle above disc b'' brings the ridge masses onto the disc in such a manner, that they are caught from the centre right up to the periphery of the disc b''. They are conveyed upwards uniformly without impeding disintegrating in the direction of the arrow, shown in the drawing, until they enter into the restricted portion formed by the guide wheel l and the guide wall r''.

If behind the sifting wheel adapted to serve as conveyor wheel an elevator is also provided, the ridge mass will be caused to break up in its structure, being thereby uniformly distributed onto the elevator, so that the sifting effect can begin to act on the earth mass.

I claim:—

1. A potato harvesting machine, comprising in combination with the conveying share, a sifting wheel having a tine rim arranged at an incline behind said share and adapted to serve as conveyor wheel, and an inclined sifting device composed of vertically adjustable sifting rings and sifting wheels surrounded by said sifting rings adapted to convey upwards and at the same time partly sift the dug potato ridge.

2. A potato harvesting machine, comprising in combination with the conveyor wheel and the sifting device, a half ring on the centrifugal force side for the potato ridge surrounding said conveyor wheel, a catching rod projecting from said half ring, and a turnout on the end of said half ring serving as guide surface, extending over said sifting device.

3. A potato harvesting machine as specified in claim 1 in which three sifting wheels are arranged superposed on a common shaft, the upper wheel having tines at a wide distance apart adapted to remove only the tops and to allow the earth and potatoes to fall onto the middle sifting wheel with narrower tines than the first having apertures in its middle portion through which the smaller material drops onto the bottom sifting wheel, so that by fully utilizing the centrifugal force effect of said sifting wheels and by the distribution of the masses the material is at the same time sifted.

In testimony whereof I affix my signature.

MARTIN LICHT.